United States Patent
Wienert

[15] 3,664,302
[45] May 23, 1972

[54] LACTATION PERIOD BROODER

[72] Inventor: Lloyd C. Wienert, Pappillion, Nebr.

[73] Assignee: Wilson & Co., Inc., Chicago, Ill.

[22] Filed: Feb. 10, 1971

[21] Appl. No.: 114,364

Related U.S. Application Data

[63] Continuation of Ser. No. 672,082, Oct. 2, 1967, abandoned.

[52] U.S. Cl.............................119/18, 119/51.5, 119/52 B, 119/71
[51] Int. Cl............................A01k 05/00, A01k 09/00
[58] Field of Search.................119/18, 22, 51, 51.5, 51.11, 119/52 B, 71

[56] References Cited

UNITED STATES PATENTS

| | | | |
|---|---|---|---|
| 2,369,316 | 2/1945 | Scott | 119/17 |
| 2,536,621 | 1/1951 | Arnold | 119/51 |
| 3,097,627 | 7/1963 | Garcia | 119/51.11 |
| 3,204,607 | 9/1965 | Arnold et al. | 119/51.11 |
| 3,228,375 | 1/1966 | Philippe | 119/22 X |
| 3,312,194 | 4/1967 | Ernst | 119/22 |
| 3,361,115 | 1/1968 | Conover | 119/18 |

FOREIGN PATENTS OR APPLICATIONS

| | | |
|---|---|---|
| 720,664 | 11/1965 | Canada |
| 325,006 | 12/1902 | France |

*Primary Examiner*—Hugh R. Chamblee
*Attorney*—Henderson & Strom

[57] ABSTRACT

A liquid animal feeder comprising compartments in which there are no openings during operation through which a pig less than three weeks old can extend its entire head, the liquid animal feeder having a moving feed delivery unit deliverying food to a row of compartments at feed delivery positions at least sufficiently close to the inner side of each compartment that pigs less than three weeks old can drink from said positions, the liquid animal feeder having means making possible delivery of feed to vertically spaced rows or compartments from the same feed delivery unit, such unit being mounted on a track having a straight side for serving a straight row of compartments, the quantity of feed delivered at each compartment being selectively controllable by convenient control means.

27 Claims, 24 Drawing Figures

INVENTOR.
LLOYD C. WIENERT

INVENTOR.
LLOYD C. WIENERT

INVENTOR.
LLOYD C. WIENERT

LACTATION PERIOD BROODER

This application is a continuation of Ser. No. 672,082, filed Oct. 2, 1967 now abandoned.

COMPARISON WITH THE PRIOR ART

In the prior art there has been no successful automatic feeder for small animals in which the same feed delivery unit serves animals in successive compartments.

The patent to Garcia, U.S. Pat. No. 3,097,627 issued July 16, 1963 titled "Automatic Time Operated Feeding Means for Successively Feeding Animals in a Plurality of Stalls" was for feeding calves and the calves could protrude their entire heads from the compartments in order to drink from a common nipple on a carrier mounted on a circular track. Such a principle would not work with many of the smaller animals such as pigs because whenever a pig can insert its head through an opening, then its entire body can pass through and the pig can escape perhaps to die.

In the Garcia patent the delivery unit rotates in a circle, necessitating circular compartment arrangements. This creates large amounts of waste space in buildings that are always rectangular and often narrow and long.

It is an object of this invention to provide a solution for the purpose of delivering feed to successive compartments disposed in a straight row, and a further objective is to deliver to compartments disposed in straight rows with the delivery unit following an endless track.

A problem with a system such as in Garcia is in the presence of track way means on the floor where it can be tripped over by an operator or people viewing a machine at a farm installation or at fairs. It is an object to provide a feed delivery unit completely suspended from over head track means so that the floor can be free of obstructions.

A further object is to provide a construction in which the area between compartments that face each other is substantially open, and as the swath of the feed delivery unit takes up a minimum of space to eliminate the greater space consumption of a swinging boom as in the Garcia patent.

A particular object is to provide a feed delivery system which deposits feed at each compartment so that the animal in a compartment can be drinking or eating even at a time when an animal in the next compartment is being delivered its ration of food. Particularly accomplished by means providing the advantage that the animals can eat within their compartments so that they cannot escape and so that an opening in a compartment, necessary for the delivery of food therethrough, need never be adjusted in size as the animal grows.

A further object is to provide means for treating each animal individually for automatically delivering to each one a different quantity of food if desired at each passing of the delivery unit.

A particular object is to provide means for making it possible for the same food delivery unit to deliver food to each one of multiple levels of compartments, eliminating the need for having a complete food delivery unit for each compartment level, which latter in the case of three levels would involve the expense and maintainence of three complete food delivery units.

A still further object is to provide a machine which will keep one animal from competing for another animal's feeding station, since pigs have been known to be true to their name and dominate more than their share, causing weaker pigs to be runted out.

Another object is to provide a frame arrangement allowing for easy removal of both compartments and excrement pans so that both can be cleaned at a convenient place, perhaps with a pressure hose or steam, and disinfected, such pans continuously draining so as to reduce humidity.

A particular object is to provide an economical and effective track and pulley arrangement in which a drive pulley impinges upon edges of the track whereby if desired both can be economically made of metal and still the track will be sufficient.

A further object is to provide a liquid animal feeder having many features which would be useful in feeding larger animals such as calves which have bodies much larger than their heads, and also having features particularly valuable in feeding all sorts of smaller animals characterized by having heads so large that whenever their heads can be inserted through an escape opening they are able to pull their entire bodies through that opening.

The following drawings and description show examples only, it is understood that this invention is protected against changes therefrom within the scope of the following claims.

In the Drawings:

FIG. 14 is a sectional view taken along the line 14—14 of FIG. 13a.

Figure 1:
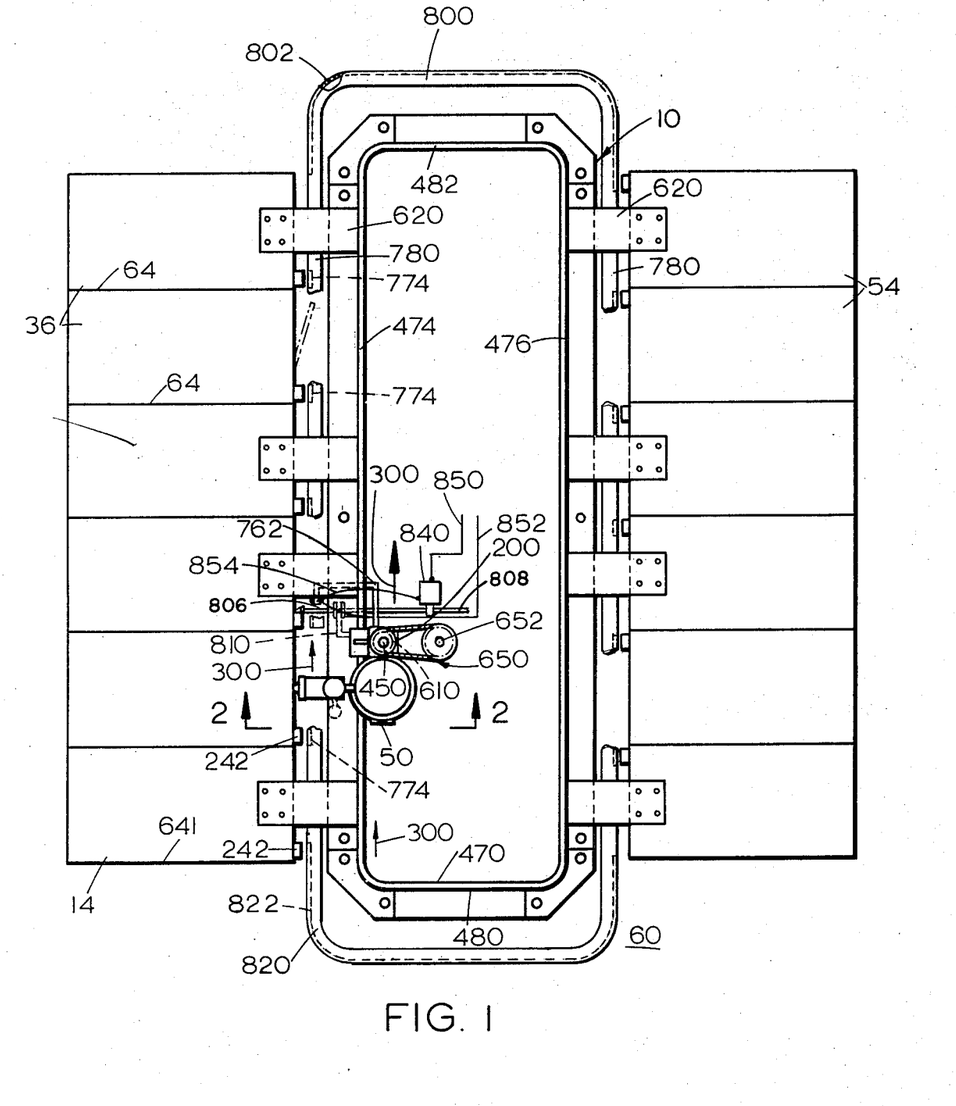
FIG. 1 is a top plan view of the feeder of this invention, one of the compartment doors being shown partially opened in dotted lines.

The liquid animal feeder of this invention generally indicated at 10 in FIG. 1 comprises a compartment structure generally indicated at 12 comprising a plurality of compartments 14 for baby animals. Each of the compartments 14 has a forward wall 20 having a feed unit receiving opening 24 therethrough, the openings 24 being interconnected and continuous so that they define a feed unit receiving slot 30 extending completely along a row 36 of side-by-side compartments 14, the row 36 being horizontally elongated for extending in a horizontal plane whereby the slot 30 is horizontally elongated. There can be many tiers of vertically spaced horizontal rows 36 of compartments 14, a lower tier being indicated at 40, a middle tier at 42 and an upper tier at 44 in FIG. 2, the number of possible tiers being variable.

An automatic feed unit is generally indicated at 50 and can be disposed between the row of compartments 36 and another row of compartments 54, the rows 36 and 54 being parallel and spaced as seen in top plan view. No compartments are placed at the ends of the space 60 between the rows 36 and 54 in order to permit access to the area 60 for servicing. Compartments 14 which are disposed alongside each other on the same level and in the same tier are separated by separation wall or side wall means 64 each of which has a notch or notched means 66 extending thereinto a substantial distance from those forward sides of each which are disposed adjacent the forward walls 20 in which the feed unit opening 24 of each is disposed so that a nipple of conventional soft rubberlike resilient nature and best seen at 70 can extend a substantial distance into each of the compartments 14 of a tier 40, 42, or 44 for feeding a baby animal in each compartment and so that the nipple 70 can horizontally pass from one compartment 14 to another in the same tier in an uninterrupted and smooth horizontal line without interruption from the various side walls or separation walls 64. There is a nipple 70 for each tier of compartments and each nipple 70 is attached to a liquid feed heating chamber 76 heated by a heating unit 78 extending through its underside which receives power as later described.

Above each liquid feed or milk formula heating chamber housing 76 is a valve assembly 80 having a valve assembly housing 84 which is attached to the upper side of the chamber 76, the interior 88 of the lower end of the valve housing 84 being connected by an opening 90 to the interior of the chamber 76 and the arrangement is such that milk formula can flow from a tank 96 through passage means 98 into the valve housing 84 and through the opening 90 in the upper side of the chamber 76.

Within the valve housing 84 is a metering valve 100 which is adapted to move upwardly and downwardly and which has frustoconical upright wall means at 110 which is constricted at its lower side and is adapted to fit a complementarily shaped frustoconical surface 112 of the inside wall 114 of the housing 84. The valve or valve stem 100, when seated, shuts off the passageway means 98 which enters at the frustoconical surface 112.

The metering valve 100 is urged downwardly by a nut 130 on a shaft 134 which vertically reciprocates, the shaft 134 being connected to valve control means 136, later described. The shaft 134 extends upwardly through an upper end member 138 of the valve housing 84 and reciprocates therethrough with a spring 140 in the housing 84 and engages the end or cap 138 and at its other end pressing downwardly on the valve 100 to urge it into seated position.

The valve 100 is urged toward an open position by a lower spring 150 disposed around the shaft 134, which latter extends completely through the valve 100 in a slidable manner, the spring 150 engaging the underside of the valve 100 at one of its ends and engaging at its opposite end an annular stop member 152 in fixed position with respect to the housing 84 and having an opening 156 vertically therethrough loosely fitting the shaft 134 so that milk formula can pass through the opening 156 therebetween.

Figure 4:
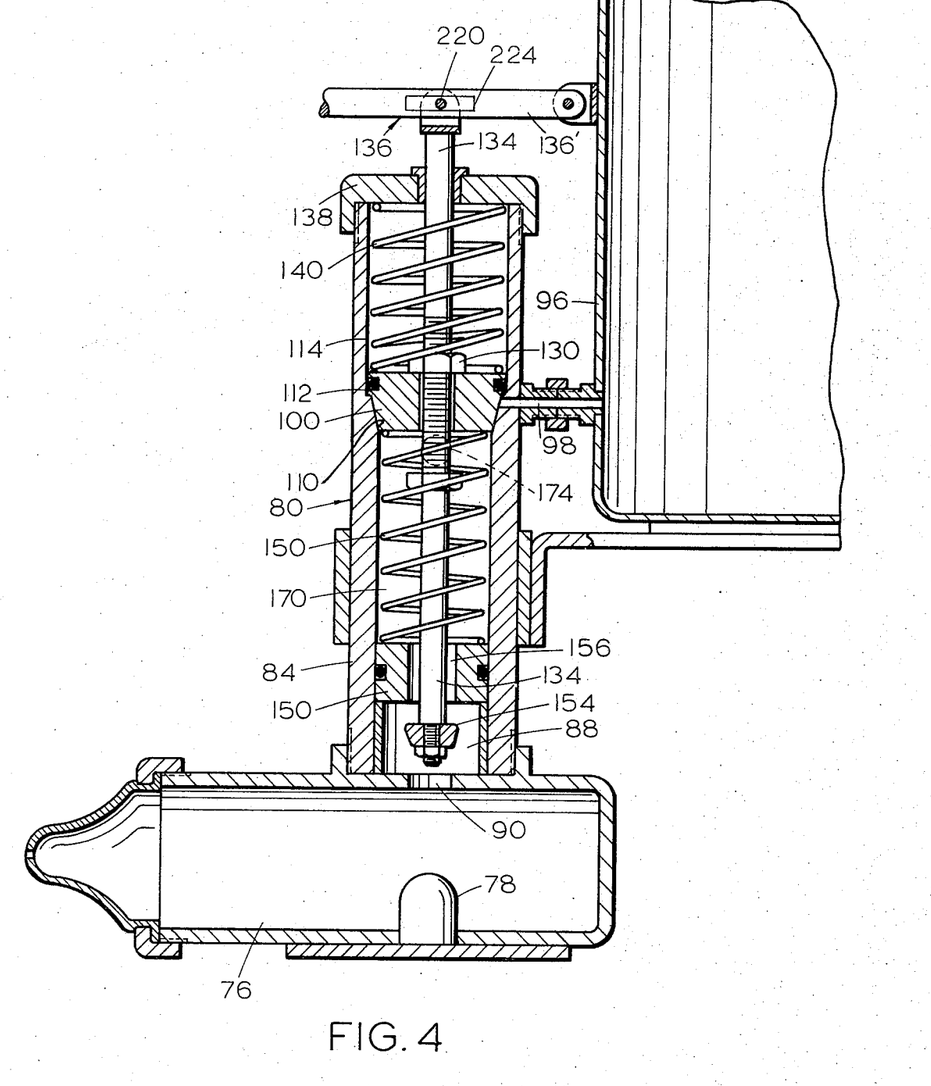
FIG. 4 is a vertical section taken in enlarged detail by removing the forward half of a portion of FIG. 3 and showing the remainder in section.

Referring to FIG. 4, it will be seen that a resilient plug 154 is fixed to the lower end of the shaft 134 so that at times when the shaft 134 is in an upper position for allowing formula to pass through the passage 98, the opening 156 will be closed by the plug 154 whereby a metered amount of milk formula enters the metering chamber portion 170 of the inside of the housing 84.

As the formula enters the chamber portion 170 (FIG. 3), air is pushed out and passes outwardly through an exit 174 into a tube 176 into a float chamber 178 of a float valve housing 180 in which a float 182 can float on formula entering the chamber 178 causing an air bleeder valve 190 attached to the float 182 to close an air bleeder opening 194 to prevent formula from passing out of the opening 194 and yet permitting air to pass through the opening 194 sufficient for the filling of formula metering chamber 170.

Figure 3:
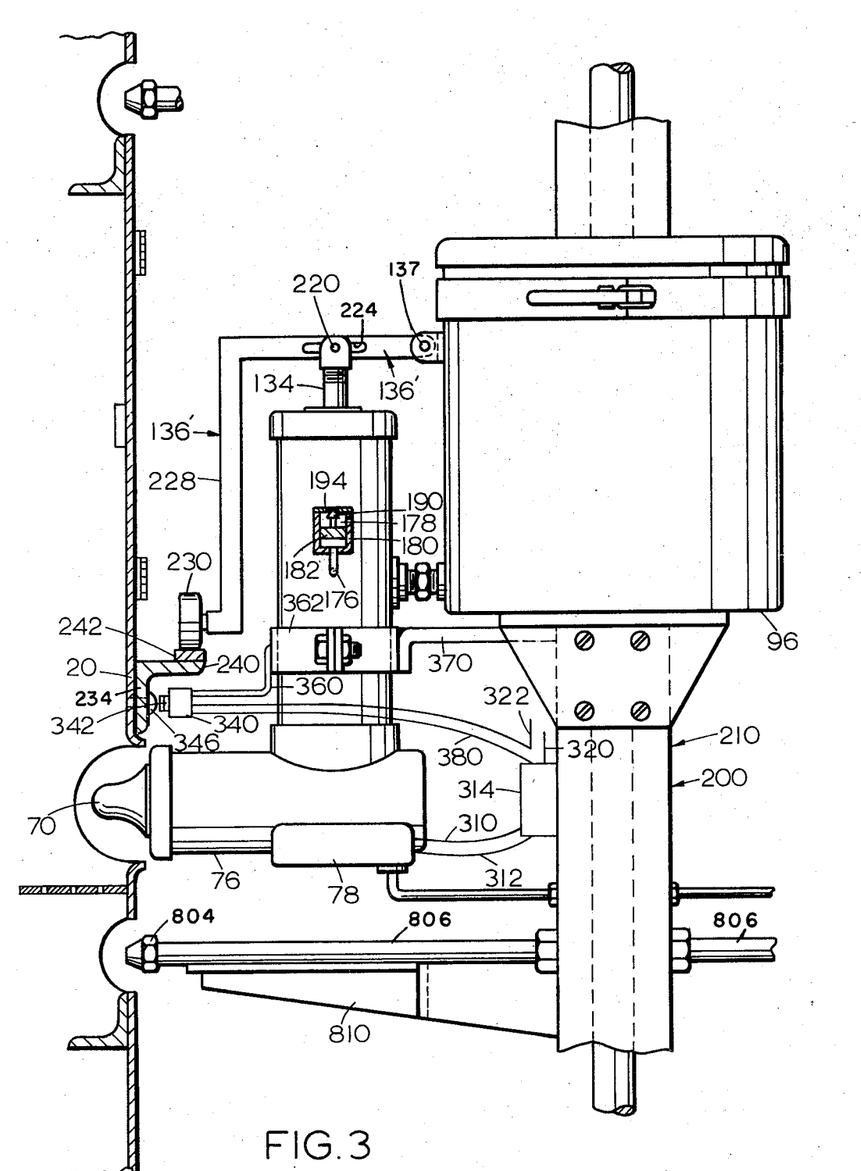
FIG. 3 is a detail of a portion of FIG. 2.

Referring now to FIG. 3, it will be seen that each formula tank 96 is mounted on a hollow post 200 of an automatically moving carrier 210 which has a frame means comprising the post 200 and the tank 96 to which the control lever 136' is pivotally attached at 137. The upper end of the shaft 134 is connected by a sliding pin 220 to the lever 136' with the pin riding in a horizontally elongated slot 224, the lever 136' extending horizontally away from the pin 137 then downwardly as seen at 228 with the roller 230 rotatably mounted on the lower end of the lever 136' and rotating in a vertical plane for engaging a track 234 fixed to the forward side wall 20 of each compartment, the track having a horizontal upper surface 240 at all places along its length except in places at which there is an upwardly extending protrusion 242 which would cause the passing roller 230 to move vertically upward momentarily as will cause the shaft 134 to move up sufficiently to cause the resilient plug 154 (FIG. 4) to close the passage 156 and to cause the passage means 98 to be open to allow formula to enter in the metering chamber portion 170.

The longitudinal length of the protrusion 242 is sufficient to hold the valve open long enough for the metering It will be understood that each row 36 (FIG. 1) of compartments 14 has its trackway 240 and that each compartment 14 has its own protrusion 242 on that side of its first side wall 64' which is approached first by the moving nipple 70 as the nipple travels in the direction of the arrows 300.

As best seen in FIG. 3, the electrical system for control of the heating unit 78 is accomplished through wires 310 and 312 which lead to the unit 78 through a connection box 314, the wire 312 being in direct communication with a power wire 320 from a power source, the other power wire 322 from the same source leading to a suitable micro-switch 340 which has a controlling element 342 facing the wall 20 where it tends to engage a micro-switch cam 346, there being a cam 346 in front of each compartment 14 and disposed directly beneath the respective metering cam or metering protrusion 242 thereof. The micro-switch 340 is mounted by means 360 and by a metering valve mounting 362 which latter is connected to the automatically moving carrier 210 in a suitable fashion such as by a bracket 370 connected to the hollow post 200.

The micro-switch cam 346 in FIG. 3 is understood to be horizontally elongated in the direction parallel with the arrows 300 (FIG. 1) so as to cause a switch connection between the power wire 322, the micro-switch 340 closed by the micro-switch cam 346, a wire 380 leading from the micro-switch 340 to the connection box 314 and connected by the box 314 to the wire 310, whereby the horizontal length of the micro-switch cam 346 is sufficient to hold the heating unit 78 in operation sufficient to warm the milk formula in the compartment 76 so that it is of the normal temperature of the mother animal in nature of the baby animal received in the compartment 14.

Figure 2:
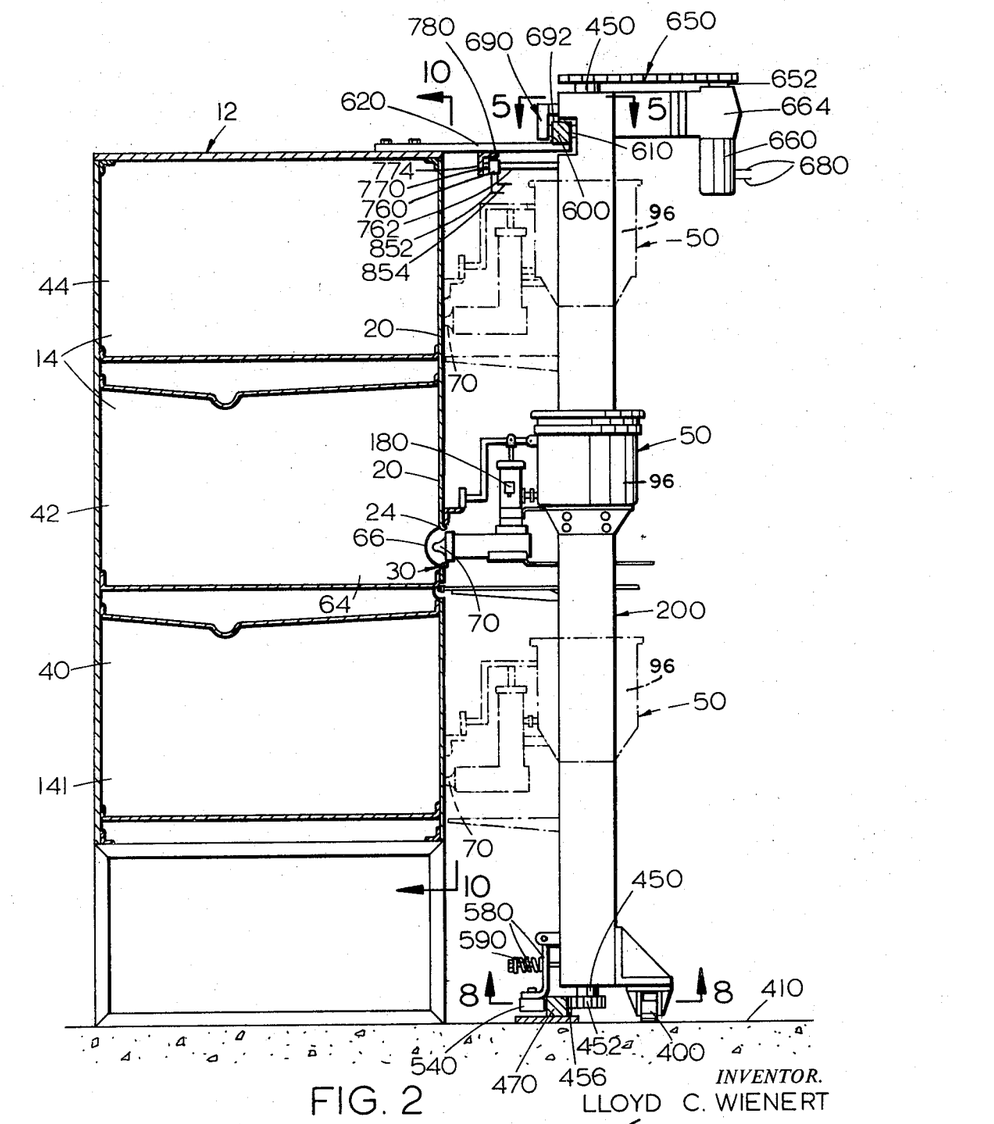
FIG. 2 is a sectional view taken along the line 2—2 of FIG. 1.

Referring now to FIG. 2, it will be seen that other tanks 96 can be mounted upon the same post 200 one above another, each connected to a respective nipple 70 by means as is shown in FIG. 3, whereby multiple feeding units 50 are provided one above another, each serving a different tier of compartments 14.

Referring now to FIG. 2, it will be seen that at the lower end of the post 200 it is supported on a roller or carrier wheel 400 riding on a horizontal surface 410 which can also form a floor for the support of the compartment system 12.

Up through the hollow post 200 is a drive shaft 450 having a lower gear 452 on its lower end disposed in engagement with a set of teeth 456 of a rack bar or rack track 470 fixed to the floor 410 and extending horizontally and having a generally rectangular shape and being continuous and having two sides 474 and 476 disposed in spaced parallelism and two ends 480 and 482 disposed in spaced parallelism and at a right angle to the sides 476.

A holding roller 540 rolls along an opposite side of the track 470 and is pressed toward it by a roller mounting mechanism 580 including a spring 590 which serves to hold the gear 452 in engagement with the track 470.

At the upper end of the compartment group 12 is another similar rack track 600 of identical shape to the track 470 and having teeth on its inner side and being engaged by an upper gear 610 likewise fixed to the shaft 450, the rack track 600 being held stationary on bracket means 620 attached to the compartment group 12, as best seen in FIG. 2.

A holding mechanism 690 similar to the mechanism 580 holds an upper pressure roller 692 ii place against the back side or outer side of the upper rack track 600.

The construction thus described assures that the post 200 will at all times move in a vertical plane because of the sychronization and registry of position of the rack tracks 470 and 600 and the identical size of the gears 452 and 610. The upper end of the shaft 450 is suitably connected by drive chain means to the shaft 652 of a drive motor 660 which is electrical, the motor 660 being mounted on a mounting bracket 664 fixed to the post 200, the motor 660 being driven by power wire 680 leading to a power source whereby the motor 660 operates continually at a very low speed for causing the post with its nipples 70 to pass each of the compartments 14 once in each hour and 51 minutes to approximate the feeding time of a mother sow.

The speed is such that each nipple 70 is in a given compartment 14 approximately 3 minutes allowing the baby animal time to discover its presence and to drink. A baby piglet can drink in less than 10 seconds to a stage of being fully fed.

Figures 10, 11, 12:
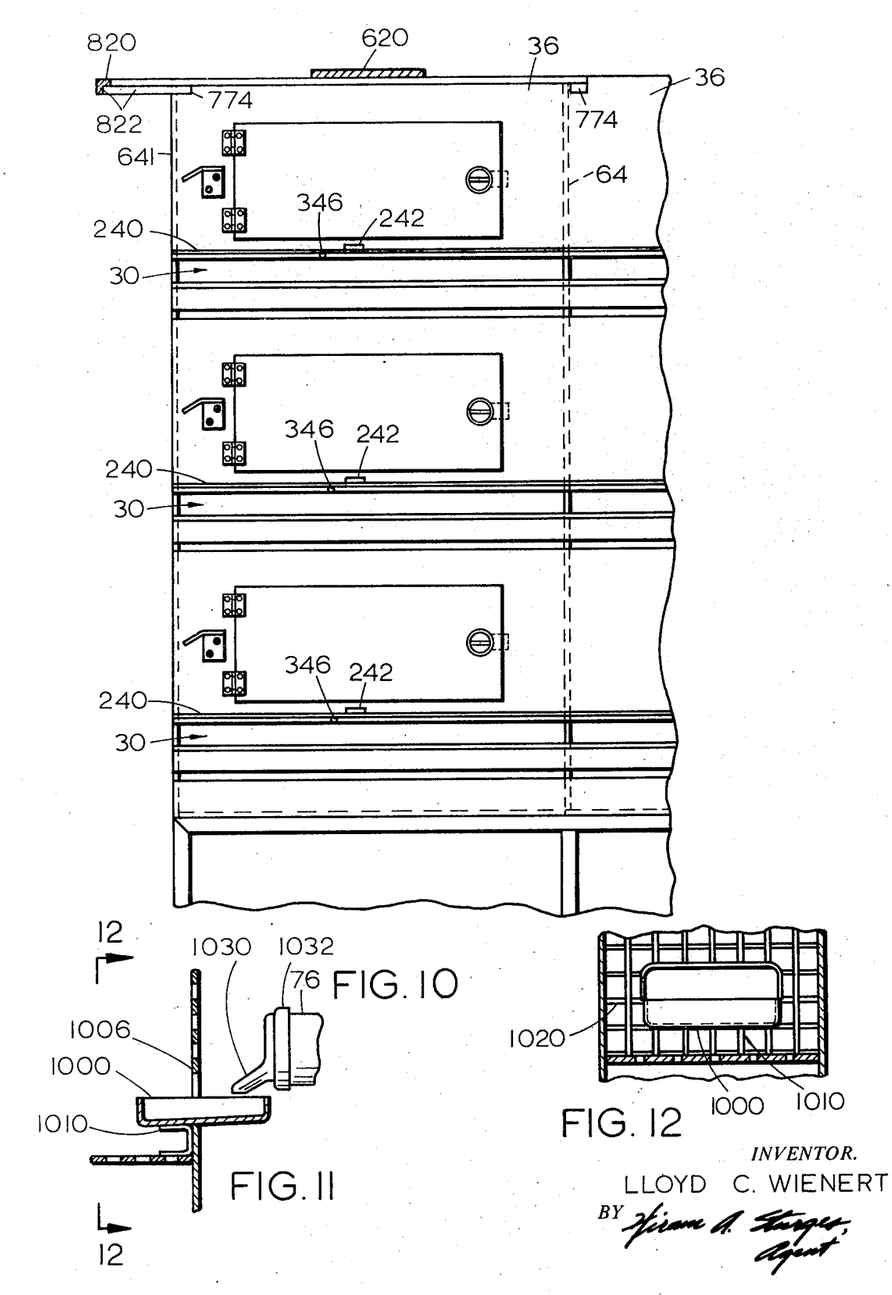
FIG. 10 is a sectional view taken along the line 10—10 of FIG. 2.
FIG. 11 is a fragmentary sectional view of a modified embodiment of a liquid feeding station.
FIG. 12 is a fragmentary sectional view taken along the line 12—12 at FIG. 11.

Referring to FIG. 1, it will be seen that it is desirable that the respective charging of the metering chamber 170 occur at a sufficient time before discharge of the chamber 170 and before operating of the heating means 78 so that the position of the formula metering cam 242 and its roller 230 be disposed substantially forwardly in the time sequence of the position of the heating control micro-switch 340. For this reason, as seen in FIG. 10, the formula cams 242 are each disposed approximately centrally between the partitions at the sides of each compartment 36 whereas the milk heating unit cam 346 can be disposed so that it is engaged by its microswitch 340 in advance of the time at which the cam 242 is engaged by its roller 230. The position of the heat control cam 346 can be approximately one-third of the way across a compartment 36 from that side of the compartment which is first passed by the nipple 70.

Referring now to FIG. 2, a wash water valve controlling micro-switch 760 is shown supported from a bracket 762, which latter is best seen in FIG. 1, attaches the micro-switch 760 to the post 200, which latter is square in horizontal cross section and is seen in FIG. 1.

The micro-switch 760 has a plunger 770 which engages various downwardly extending flanges 774 which extend downwardly from horizontally extending support members 780,which latter are fixed to and supported by the respective bracket means 620, whereby the flanges 774 can be called water control cam flanges 774 and are to be found one disposed immediately on the inner side of each partition 64 or 641 which is on the leading side of each compartment 36, the term "leading" meaning that side of each compartment 36 which is first approached by the moving nipple 70.

At the end of the row of compartments 36 is a support bar 800 which of U-shape in top plan view and which, as best seen in FIG. 1, is supported on endmost ones of the bracket 620.

The horizontally extending support bar 800 supports on its underside a downwardly extending water control cam flange 802 arranged in a position for engaging the plunger 770 of the micro-switch 760 at times when the plunger 770 passes through the open area at the end of the row of compartments 36, the cam flange 802 continuing until it has extended all the way around the end and overlaps the endmost part of the adjacent end of the row of compartments 54, whereby it serves to maintain the micro-switch 760 in a condition for maintaining the flow of water off so that water from the nozzle 802 does not spray out all over the room as would otherwise be the case and because of structure yet to be described.

A similar U-shaped bar 820 is disposed at the opposite end of the structure and extends between the opposite ends of the respective rows of compartments 36 and 54 respectively having a similar water control cam flange 822 likewise mounted in a position for engaging the plunger 770 of the switch 760, to maintain the water off as it passes by the opposite end of the structure and between the rows of compartments 36 and 54.

Referring now to FIG. 1, it will be seen that the nozzle 804 is supplied by a pipe 806, which latter receives water from a pipe 808, but only at times when a solenoid controlled valve 840, is open, the electrical power for operating the solenoid valve 840 coming from power lines 850 and 852, power to the valve 840 going directly to it by connection with the power line 850.

The power line 852 extends to the micro-switch 760 and another line 854, as best seen in FIG. 2, leads from the micro-switch 760 back to the solenoid valve 840, best seen in FIG. 1, whereby the valve 840 is powered for allowing its valve to open for water flow through to the nozzle 804 only at times when the micro-switch plunger 770 is not in engagement with a respective water control cam flange 774, 802, or 822.

Figure 13:
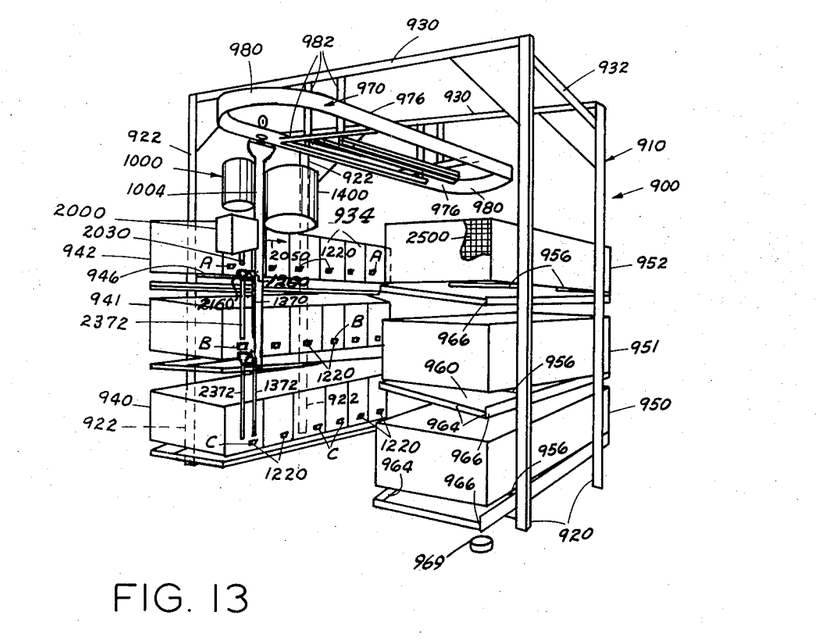
FIG. 13 is a perspective view of a modified embodiment of the invention.

Referring now to FIG. 13, a modification of the machine earlier described is there shown and is generally indicated at 900 and is also called a liquid animal feeder. The machine 900 has frame means generally indicated at 910 preferably comprising a pair of upright posts 920 disposed in a plane and spaced from a second pair of upright posts 922 disposed in a plane parallel to the plane of the posts 920.

The posts 920 and 922 are respectively interconnected by upper frame members 930 and 932, whereby the posts 920 are interconnected and the posts 922 are interconnected and the posts 922 are connected to the posts 920.

A plurality of compartments for animals are shown at 934 and are disposed side by side in a horizontal row. The compartments 934 of a row are fixed together so that they form a rigid unit.

In the example shown in FIG. 13, there are six rows, three rows being shown at 940, 941, and 942 on a left-hand side of the brooder 900 and supported one above the other in spaced apart relation upon row supports 946 which are fixed to and extend outwardly from the posts 922, the supports 946 extending horizontally, whereby two supports 946 support each row in a horizontal position.

Figure 13A:
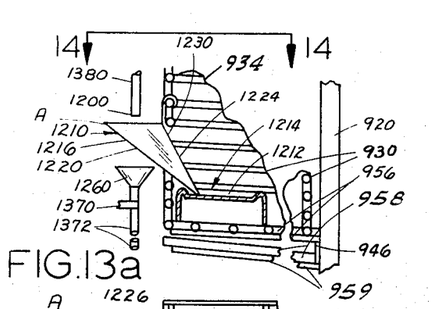
FIG. 13a is a fragmentary view inside elevation of a second modified embodiment of a feeding station.

On the right-hand side of the brooder 900 are rows of compartments 950, 951, and 952, which are supported on compartments supports 956 extending inwardly of the brooder and horizontally from respective posts 920, in the same manner as in FIG. 13A.

As seen in FIGS. 12 and 13A, one of six excrement pans 958 extend under each row of compartments carried by excrement pan supports 959 which latter are arranged in pairs, one pair of supports 959 for each row of compartments, each support 952 being attached to one of the adjacent posts 920 or 922, as seen in FIG. 13 A.

The pan supports 959 are inclined from their upper inner ends downwardly and outwardly toward the posts so that their substantially planar bottom walls 960 incline outwardly toward the posts and are preferably arranged to incline also toward a suitable outlet opening in a vertical wall 964 that surrounds a pan at its perimeter. Such an opening in the wall 964 is for continuous drainage and an opening can be provided by allowing a slot to exist extending vertically down into and through the wall 964 at a corner, such as is seen at 966, whereby a continuous drainage occurs and a catching pan or floor drain can be disposed as seen at 969 beneath the openings 966, whereby moisture on the pan is controlled to regulate humidity.

Figures 16, 17, 18:
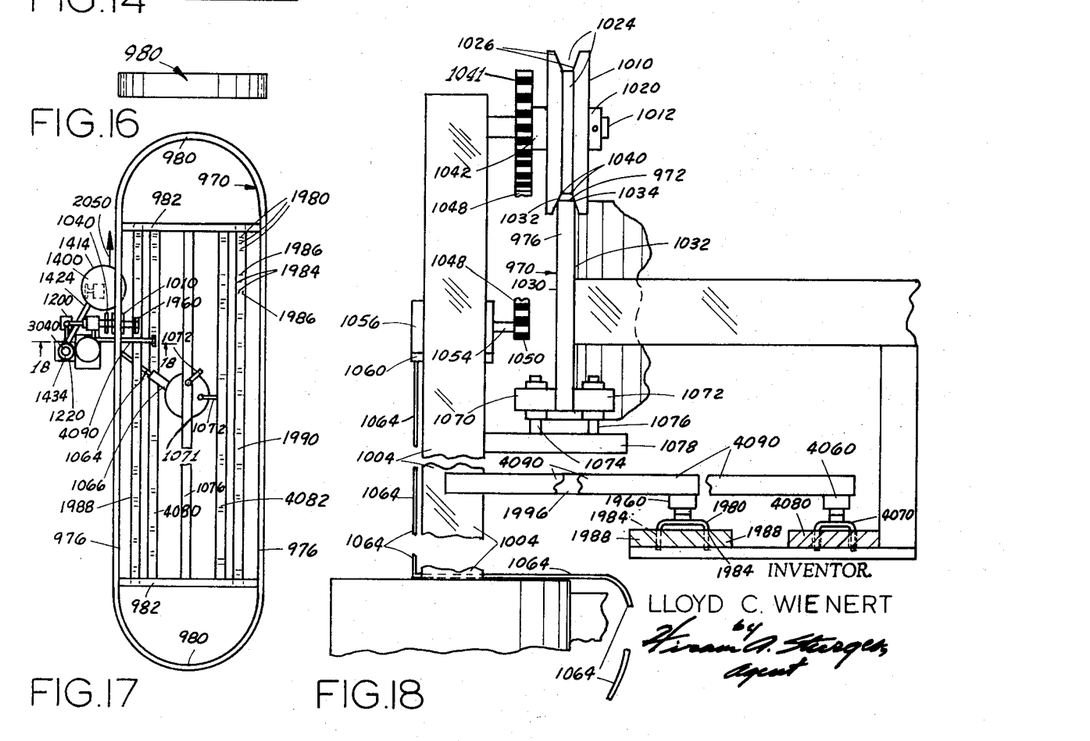
FIG. 16 is an end view of the track means.
FIG. 17 is a top plan view of the invention showing the track means and feed delivery unit.
FIG. 18 is a sectional view taken along the line 18—18 in FIG. 17.

Referring now to FIG. 13, a horizontally extending track means is there shown at 970, and the track 970 can be shown in detail in FIG. 18 and is seen to have a horizontal upper edge 972. Expressed in another way, the uppermost parts of the upper edge 972 extend in a horizontal plane. The track 970 itself has side portions 976 which are spaced apart and parallel and extend along and are spaced somewhat inwardly from the inner sides of the compartments 934, whereby the sides 976 are disposed parallel to the rows of compartments.

The sides 976 extend the entire length of the rows and the two sides are connected at their two ends respectively by curved portions 980 which are preferably semi-circular, as best seen in FIG. 17.

The sides 976 are supported on hanger frame means 982 which latter is attached to and suspended from the horizontal frame members 930.

Referring to FIG. 12, it will be seen that in order to deliver feed to each of the compartments 934, a feed delivery unit generally indicated at 1000 is provided.

The feed delivery unit 1000 has a support shown at 1004, which latter can be seen in FIG. 18 to have a pulley 1010 mounted thereon by means of a horizontal shaft 1012 extending inwardly from the support 1004, the pulley being held in place by retainers 1020 so it cannot move axially of the shaft 1012. The pulley 1010 has an annular circumferential recess 1024 therein and the side walls 1026 of the recess 1024 have a tapering shape in cross section when viewed along a plane extending through the axis of the pulley wheel or along any plane extending parallel to a vertical plane extending through the axle shaft 1012, and is best seen in FIG. 18. The side walls 1026 are more widely spaced at their outer ends near the outer circumference of the pulley than they are at their inner ends and the spacing of the side walls 1026 at the outer portions of the pulley side walls 1026 is greater than the spacing of the sides of the track means which latter are shown at 1030 and 1032. The upper side 972 can be seen to have two opposite downwardly extending sides 1030 and 1030 and to have two opposite edges 1034 which are disposed in parallelism.

The edges 1034 and the spacing of the sides 1030 and 1039, especially in the area of the pulley 1010 are substantially greater than the spacing of the inner portions 1040 of the pulley recess wall 1026, whereby as the pulley rolls along the track means 970, it will grip the track means firmly and impinge thereon giving good traction, as is very important.

It was found in experiments that a pulley made of metal and a track made of metal will not give good traction without the impingement afforded by this shape of pulley. Economy was achieved by this means over much more complicated and costly ways of gaining traction.

Figure 5:
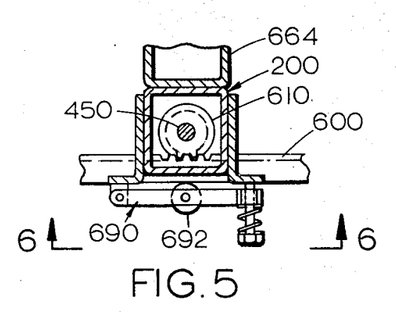
FIG. 5 is a sectional view taken along the line 5—5 of FIG. 2.
Figure 6:
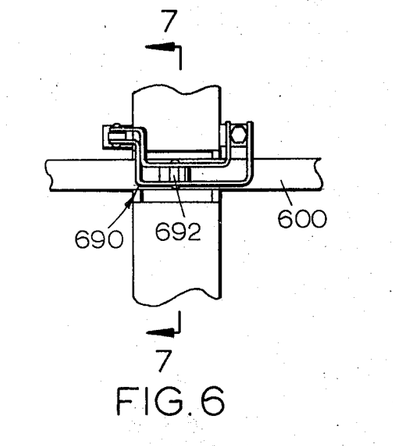
FIG. 6 is a sectional view taken along the line 6—6 of FIG. 5.
Figure 7:
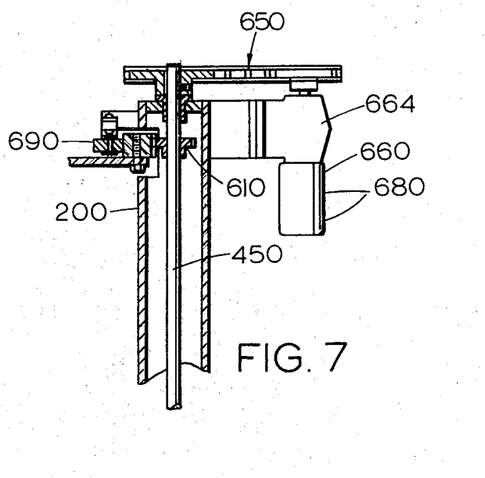
FIG. 7 is a sectional view taken along the line 7—7 of FIG. 6.
Figure 8:
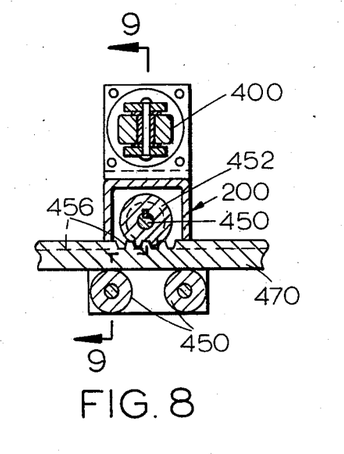
FIG. 8 is a sectional view taken along the line 8—8 of FIG. 2.
Figure 9:
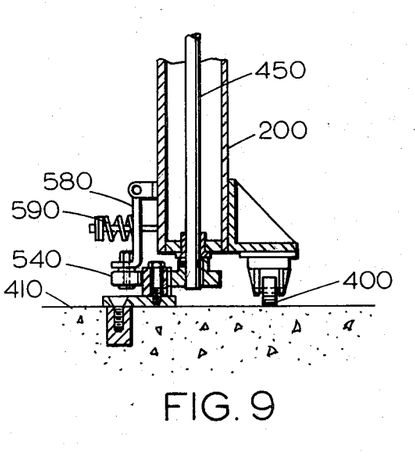
FIG. 9 is a sectional view taken along the line 9—9 of FIG. 8.

The use of the rack bar 470 of FIG. 8 and the rack bar 600 of FIG. 5 with their cog wheels 452 and 610 was a much more costly and earlier way of gaining traction involving great manufacturing precision in many respects, especially the exact positioning of the rack bars area.

The pulley wheel system of FIG. 18 makes it unnecessary to have curving rack bar means at the ends of the track and the semi-circular track ends 980 are very important for good traction and dependable day-in and day-out operation.

Referring to FIG. 18, it will be noted that a large sprocket 1041 rotates freely on the shaft 1012 and is fixed by suitable means 1042 to the gear 1010 for driving the gear. The sprocket 1041 is driven by means of a chain 1048 which extends around a smaller gear 1050 on a shaft 1054 of a motor 1056, which latter is secured to the support 1004 by a mounting means 1060.

A pair of horizontally spaced stabilizing pulleys 1070 and 1072 are mounted on shafts 1074 and 1076, which latter are on an arm 1078 fixed to the support 1004. The pulleys 1070 and 1072 rotate about vertical axes and are spaced downwardly from the drive pulley 1010 and engage opposite side walls of the 970.

The motor 1056 continuously receives power through a cord 1064, which latter extends downwardly and inwardly therefrom toward the center of the trackway 970 where it is connected to a commutator assembly 1071, best seen in FIG. 17. The assembly 1070 is of a type for accomplishing a continuous electrical connection between its imput cord 1072 and its electrical output cord 1064, earlier described. In FIG. 17, imput cord 1072 is shown broken away, but it will be understood that it can lead to an electrical outlet.

The commutator 1071 has an upper portion which is stationary and carried by the frame member 1076, which latter is attached to the hanger frame means 982, as best seen in FIG. 17. The cord 1064 has slack in it, as best seen in FIG. 18, sufficient that the cord will permit the free travel of a motor 1056 as it moves around the trackway on the support 1004.

The feed delivery unit 1000 has a feed outlet 1200, best seen in FIG. 13A, which moves with the feed delivery unit as it travels around the trackway 970. The outlet 1200 moves along each of the compartments 934 of the upper rows of compartments 942 and 952 and feed presentation means generally indicated at 1210 and of which the outlet 1200 forms a part is provided in operative correlation with the feed delivery unit 1000 for receiving feed from the feed delivery unit 1000 and presenting the feed into feed delivery positions, an example of which is the position 1212 which is the upper side of the feed trough 1212 which forms a part of a container 1214.

Each container 1214 has a portion disposed inside a respective compartment and another portion 1216 disposed outside that same compartment.

The portion 1216 is the outer part of a feed chute 1220, as seen in FIG. 13A, and the feed chute 1220 also extends inwardly of the compartment 934 through an opening 1230 in that side of the compartment which faces the feed delivery unit 1000. The inner end 1224 of each feed chute 1220 extends inwardly of the compartment 934 until it is above the trough. Each feed chute 1220 has side walls 1226 and a bottom wall 1228.

Although the top of the container 1214 provides a feed delivery position 1212, another sort of a feed delivery position and equally fulfilling that general term is provided by the tip of the nipple 70 of the modification of FIG. 3.

Figure 15:
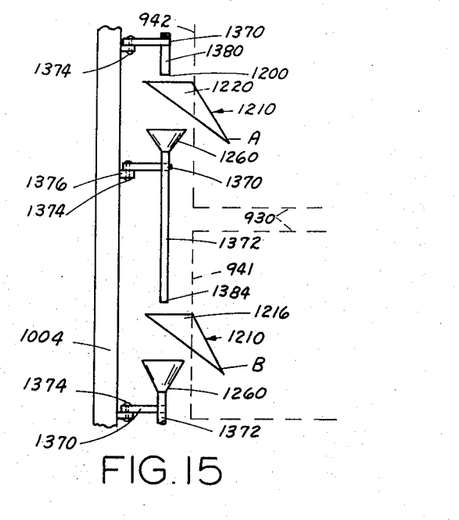
FIG. 15 is a fragmentary diagrammatic view of the feed delivery unit.

In FIG. 15, a diagrammatic view is shown in which a first or upper row of compartments 942 is spaced above a lower row 941, each has a container 1210 identically describable to the container 1210 of the upper row 942.

In FIG. 15, the containers 1210 of the top row 942 are disposed substantially in a row generally parallel to their container row 942 and the containers 1210 in the lower row or second row 941 are disposed also substantially in a row generally parallel to the containers 1210 in the top row 942. A suitable receptacle 1260 is seen in FIG. 15 and it is preferably a funnel, the receptacle 1260 being attached to the feed delivery unit 1000 by means suitably mounted on its elongated support 1004, as best seen in FIG. 15.

Such mounting preferably comprises one of a plurality of horizontal brackets 1370 which latter are attached to a conduit 1372 extending downwardly from a funnel 1260, the bracket 1370 being pivotally attached by a pin 1374 to an ear 1376 projecting outwardly from and fixed to the support 1004. The reason for the pivot pin 1374 is so that the bracket 1370 can be swung to one side for disposing a funnel or receptacle 1260 away from a container when desired.

As thus described, it will be seen that the receptacle 1260 moves with the feed delivery unit 1000 along one side of a row of compartments 942 or 952. The receptacle 1260 is spaced beneath the outlet 1200 of the tube 1380, whereby at a certain time when the outside portion 1216 of one of the containers 1210 in the first row of compartments 942 is not disposed beneath and in the path of feed flowing from the outlet 1200, then at such certain times feed flowing from the outlet 1200 will fall by gravity downwardly into the open top of the receptacle 1260 and the conduit 1372 in communication with the bottom of the receptacle 1260 will carry it downward into a position indicated by a sub-outlet 1384 at the bottom of a conduit 1372 which is in a position disposed directly above the outside portion 1216 of one of the containers 1210 in a lower row 941 of containers at the said such certain times of feed delivery.

Figure 14:
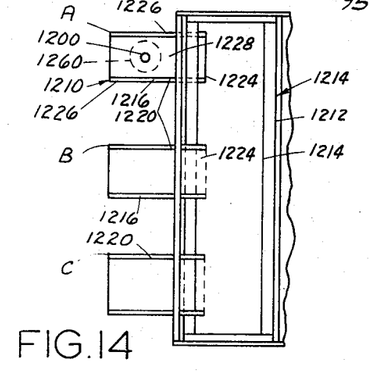

Referring to FIG. 13, it will be seen that the outside portions of the containers 1210 of the upper row 942 are disposed to the left and staggered as seen in top plan view in FIG. 14 with respect to the outside portions of the containers 1210 of the next lower row 941. It is because of the conception of this staggering that it is possible that at times when the outlet 1384 of FIG. 15 is disposed above a chute indicated at B in FIG. 15, it therefore will be that there will be no chute A of the upper row 942 beneath the upper outlet 1200. This will simply cause feed from the outlet 1200 to by-pass and flow along the side of the upper chute A passing through the receptacle 1260 and the outlet 1384 into the chute B.

By the same token, there are times when feed flowing through the outlet 1384 will miss the chute B and will be caught by a receptacle 1260 beneath the chute B, which latter has its own conduit 1372' leading downwardly to a container on the lowermost row of containers 940 and 950.

A water tank 1400 (FIGS. 13 and 20) mounted on the support 1004. The tank 1400 has an outlet 1410 through which water flows through a pipe 1412 to a pump 1414, which latter is driven by a motor 1420 connected to the pump 1414.

The pump 1414 has an outlet line 1424 which has an open terminal end 1430 disposed for emptying into a milk formula mixing chamber 1434 mounted on a dry milk formula tank 1440 carried on the support 1004.

Figure 20:
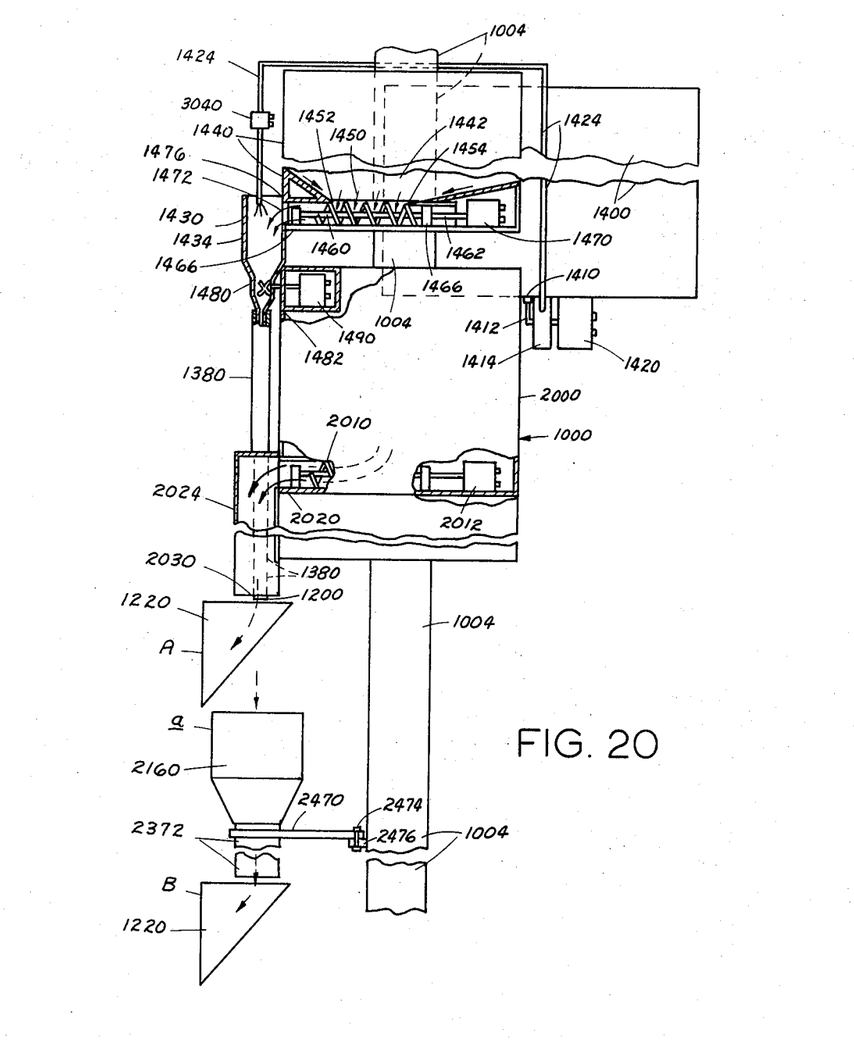
FIG. 20 is a fragmentary enlarged view of the feed delivery unit.

In FIG. 20, a portion of the tank 1440 is broken away showing its interior at 1442 and arrows 1450 indicate the flow of dry milk formula powder from the chamber 1442 into a cylindrical auger housing 1452 having an open top 1454 for allowing the milk formula to reach an auger 1460 having a shaft 1462 received in bearings 1466 and driven by a motor 1470.

Milk formula powder flowing from the auger 1460 in the direction of the arrows 1472 passes out an opening 1476 in the auger housing 1452, the openings 1476 opening upon the mixing chamber 1434 where the formula pours into the chamber 1434 together with the water from the outlet 1430 and the two are thoroughly mixed in a churn 1480 in the bottom end of the chamber 1434 in which there is an agitator propeller 1482 driven by a motor 1490. Liquid formula then flows into the tube 1380, a lower portion of which cannot be seen in FIG. 20, but which can be seen in FIG. 13A and in FIG. 15, whereby the flow of formula enters chutes as is accomplished in a manner earlier described.

Figure 19:
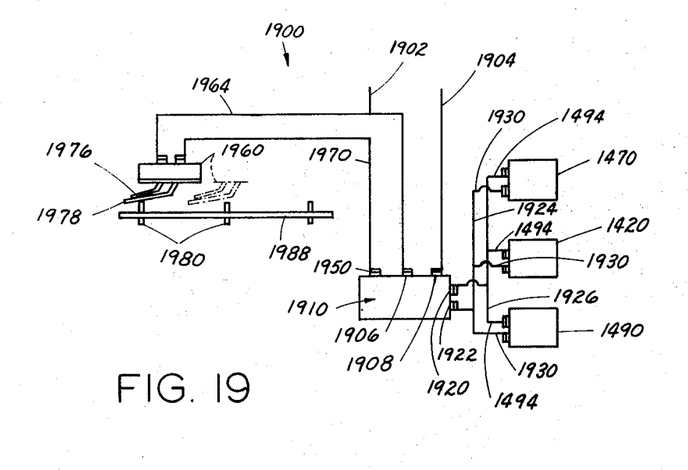
FIG. 19 is a fragmentary wiring diagram of the pre-settable control assembly.

Referring to FIG. 19, a pre-settable control assembly is there shown generally at 1900 in which power lines 1902 and 1904 come from a source of power not shown, and are connected to two terminals 1906 and 1908 of a hold relay assembly 1910, which latter has two output terminals 1920 and 1922 connected to wires 1924 and 1926 respectively, which latter are connected by leads 1930 each to a terminal of the auger motor 1470, the pump motor 1420 and the mixer motor 1490. The other terminal of each of these motors is connected by one of the leads 1494 to the wire 1926.

It is to be understood that the hold relay assembly 1910 may be of any suitable conventional construction so that it causes power to pass through its outlet terminals 1920 and 1922 for a given and known time period at each time a control terminal 1950 of the hold relay assembly 1910 receives power from power wire 1902 through a switch 1960 by means of a wire 1964 leading from wire 1902 to the switch 1960 and another wire 1970 leading from the switch 1960 to the terminal 1950.

The switch 1960 closes whenever its stationary contact 1976 is engaged by an upwardly and downwardly springing movable contact 1978.

The movable contact 1978 is adapted to be pushed into switch-closing engagement whenever it strikes one of many U-shaped pegs 1980 which latter are received in openings 1984 in a liquid formula or liquid feed peg bar 1988, best seen in FIG. 18.

The peg bar 1988 is elongated and two liquid formula control peg bars 1988 and 1990 can be seen in FIG. 17 to be suspended from the hanger frame means 982, earlier described. Some pairs of empty openings 1984 can be seen in 1988 in FIG. 17, and it will be understood that empty openings are to be used opposite a feed chute 1220 which leads to a compartment in which there is no animal to be fed.

However, in FIG. 17, certain milk formula pegs 1980 are shown in place in the peg bar and if these are disposed in groups of three closely spaced opposite the position of one of the chutes 1216, then as the milk formula outlet tube 1380 passes by that chute 1216, the switch 1960 of FIG. 19 will be caused to close, open again, close, and open again, and close to a total of three closings, thereby delivering three units of milk formula to that chute 1216 and its compartment. However, if an operator should put only two pegs opposite a chute, then that chute would receive only two units of milk formula. In the case of pigs, a unit of milk formula is one ounce.

For convenience of illustration, pegs are not shown all along the bar 1988, but it will be understood that they are used in whatever positions they are needed in accordance with the presence of animals and the size and appetites of animals in the various compartments.

The peg bar 1988 has holes 1984 in it extending in spaced positions from one end of the bar to the other.

The bar 1988 serves that row of compartments which are closest to it. The bar 1990 serves those compartments which are on the opposite side of the unit and to which it is closest.

Referring to FIG. 18, it will be seen that the switch 1960 is carried on a switch arm 1996 attached to support 1004 so that the arm 1996 always extends inwardly to position the switch 1960 above whichever peg bar 1988 or 1990 is the closest.

Referring again to FIG. 20, the feed delivery unit 1000 is further seen to have a pellet container 2000 attached to the support 1004 and having an auger assembly 2010 identical in all respects to the auger assembly 1460 and driven by a motor 2012 so that the pellets from the container 2000 can flow downwardly to the auger 2010 and be pushed out an opening 2020 into a large dry pellet conduit 2024.

The conduit 2024 has an outlet 2030 which is disposed in a position for passing above the chutes 1220 of the upper rows 942 and 952.

However, it is to be noticed that the outlet 1230 is disposed to the rearward with respect to the direction of travel of the feed delivery unit, as indicated by the arrows 2050 of FIGS. 17 and 12, with respect to the liquid formula outlet 1200. The spacing is such that at a time when the dry pellet outlet 2030 is disposed above an upper chute 1220, then the liquid feed outlet 1200 would be disposed above a chute 1220 of the next lower row 941 or 951. To put it in another way, when, as best seen in FIG. 13, the dry pellet outlet 2030 is disposed above a chute 1220 of the second row 941 or 951, then the liquid outlet 1200 will be disposed directly above the chute 1220 of one of the lower rows 940 or 950.

This means that a pig will first receive milk formula and then a short time later will receive pellets, Both passing through the same chute 1220 and into the same trough 1212. If the pig has not finished his liquid feed, then the mixing of the solid feed with it at the trough 1212 is even advantageous.

Referring again to FIG. 20, it will be seen that a dry feed receptacle 2160 is disposed spaced vertically beneath the dry feed outlet 2030 to catch feed therefrom that by-passes any chute 1220 that might not be disposed therebetween. The dry feed receptacle 2160 leads to a second dry feed conduit 2372, which latter is adapted to be disposed above a chute 1220 seen in FIG. 20 at B and which represents a chute in one of the second rows 941 or 951.

Although it is not shown in FIG. 20, it will be understood that a third conduit is disposed beneath the second conduit 1272 and has at its upper end a dry feed receptacle 2160 which would be for carrying dry feed destined for the lowermost rows 940 and 950.

Each dry feed conduit 2372 which is disposed below the uppermost rows of chutes 1220, seen at A, is supported from support 1004 on a swinging arm 2470 which operates in the same way as the arm 1370 and is carried by a pivot 2474 extending vertically and attaching it to ear 2476 attached to the support 1004.

Referring to FIG. 13, it will be seen that the side, top and bottom walls of each compartment 934 have the majority of their area covered by wire mesh as diagrammatically shown at 2500, the remainder of the mesh not being shown because it would be confusing on this small scale of drawing.

Figure 21:
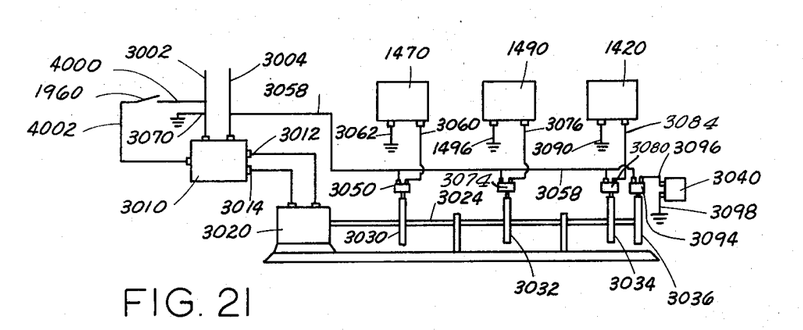
FIG. 21 is an alternate viewing diagram for the liquid feed mechanism.

In FIG. 21, an alternate wiring diagram is shown for the liquid feed in which the power comes through power lines 3002 and 3004 to a hold relay 3010, the hold relay having two output terminals 3012 and 3014 connected to a cam shaft motor 3020 to a cam shaft 3024 having on it four cams 3030, 3032, 3034, and 3036, which are respectively a milk formula powder cam 3030 for controlling the timing of the auger motor 1470; a mixer cam 3032 for controlling the timing of a mixer motor 1490; a pump can 3034 for controlling timing of the pump motor 1420; and a water valve cam 3036 controlling timing of a solenoid water valve 3040,best seen in FIG. 20, and controlling flow through the water line 1424.

The cam 3030 engages a switch 3050 delivering power from the power line 3004 which reaches the switch 3050 through a circuit 3058 to the auger motor 1470 through a wire 3060. The other terminal of the motor 1470 is grounded by a wire 3062 and the power wire 3002 is grounded at 3070 to complete the circuit.

The mixer cam 3032 operates a switch 3074 connecting the circuit 3058 with a wire 3076 leading to the mixer motor 1490, the other terminal of the mixer motor 1490 being grounded at 1496.

The pump cam 3034 is connected to a switch 3080 which, when closed, connects circuit 3058 with a wire 3084 connected to the pump 1420, the other terminal being grounded at 3090.

The water valve cam 3036 is connected to a switch 3094 which, when closed, connects the circuit 3058 with a wire 3096 connected to a solenoid valve 3040, the other terminal of which is grounded by a wire 3098.

Power leaving output terminals 3012 and 3014 leaves only for a period of time controlled by the hold relay 3010, such a time period beginning whenever a switch 1960 is closed.

Figure 22:
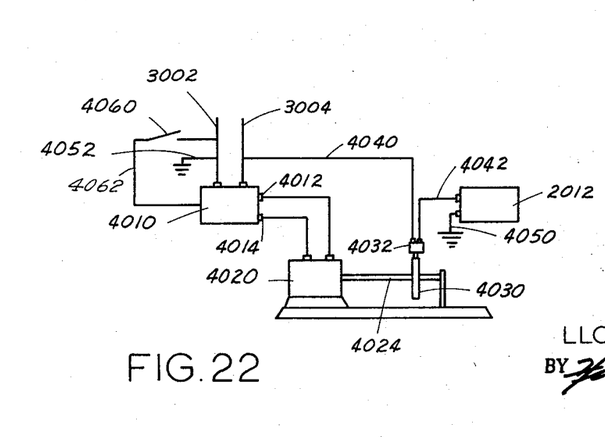
FIG. 22 is a viewing diagram for the day pellet feed mechanism.

In FIG. 22, the wiring diagram for the dry pellets is shown in which there are power wires 3002, 3004 connected to a holding relay 4010 having outlet terminals 4012,4014 connected to a cam shaft motor 4020 on which is a cam 4030 which can be called a dry pellet cam 4030 since it controls a switch 4032 which, when closed, connects a circuit 4040 attached to power wire 3004 to a wire 4042 leading to the dry pellet motor 2012 the other terminal of which is grounded at 4050 and power wire 3002 is grounded at 4052.

The dry pellet peg bar switch 4060 is connected to the power wire 3002 and when closed causes the holding relay 4010 to operate because the switch 4060 is connected by a wire 4062 to the holding relay 4010. The switch 4060, as seen in FIG. 18, is actuated by pegs 4070 in one of two dry feed peg bars 4080.

Figure 23:
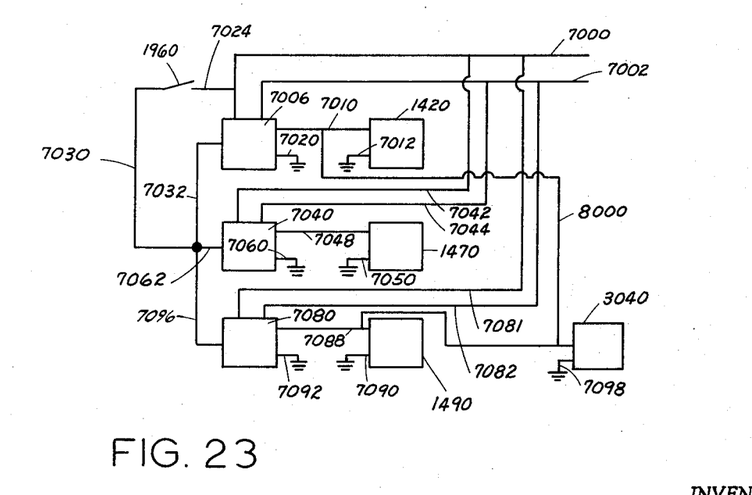
FIG. 23 is a second alternate viewing diagram for the liquid feed mechanisms.

In FIG. 23 an alternate wiring diagram is shown for the liquid feed mechanism in which the power comes through power wires 7000 and 7002 connected to a pump holding relay assembly 7006, which latter has an output wire 7010 connected to a terminal of the pump motor 1420, the other terminal of the pump motor 1420 being grounded at 7012, and the other output terminal of the pump holding relay assembly 7006 being grounded at 7020.

Initiation of operation of the holding relay assembly 7006 is controlled by the switch 1960 shown in FIG. 19, the switch 1960 being connected by a wire 7024 to the power wire 7000. The other terminal of the switch 1960 is connected by a wire 7030 and by a wire 7032 to the holding relay assembly 7006 for initiating operation of the latter when the switch 1960 is closed.

An auger holding relay assembly 7040 is connected to the power wires 7000 and 7002 by wires 7042 and 7044.

The auger hold relay 7040 is connected by an output wire 7048 to one terminal of the auger motor 1470, the other terminal of the auger motor 1470 being connected by a wire 7050 to ground.

The hold relay 7040 has its other output wire 7060 grounded.

The hold relay 7040 is connected by a wire 7062 to the wire 7030.

The mixer hold relay 7080 is connected by power wires 7081 and 7082 to the power wires 7000 and 7002. An output wire 7088 of the hold relay 7080 is connected to a terminal of the mixer motor 1490, the other terminal of which is grounded by a wire 7090.

The other output wire 7092 of the hold relay 7080 is grounded.

A wire 7096 connects the hold relay 7080 to the wire 7030.

As thus described, in operation the circuit of FIG. 23 has the effect of initiating operation of the hold relays 7006, 7040 and 7080, whenever the switch 1960 is closed. Since the hold relays are either designed on a basis of thermal heat build-up or designed on any other conventional basis, they have the effect of creating a time delay, such that for each time the switch 1960 closes, each of the hold relays puts out power toward its attached motor 1420, 1470 or 1490 for a given period of time, each hold relay operating for a different desirable period of time.

As thus described when the hold relays of FIG. 23 are used one for each motor, the cam motor of FIG. 21 and its cam shaft cams and switches are not used.

The solenoid valve 3040, shown in FIG. 23, is grounded at 7098 and its other terminal is connected by a wire 8000 to the wire 7010 so that the valve 3040 will open whenever the motor 1420 has been energized.

I claim:

1. A pig brooder for simultaneously and substantially automatically feeding to baby pigs 1, 2 and 3 weeks old varying rations of milk solids and water comprising support means, a plurality of vertically and horizontally spaced compartments disposed in upper and lower rows, said compartments being mounted on said support means, a feed delivery unit, means for supporting said delivery unit relative to said compartments, feed-receiving container means mounted on each said compartment and adapted to receive delivery from said delivery unit, means repeatedly automatically moving said delivery unit past one side of said compartments, said compartments having feed passage openings therethrough and said compartments having no openings therethrough during proper use larger than the head of a baby pig less than one week old whereby baby pigs cannot fall out, said feed delivery unit delivering to pre-selected ones of said container means a pre-selected quantity of water soluble milk solids suitable for baby pigs less than 3 weeks old, said feed delivery unit delivering to pre-selected ones of said container means a preselected quantity of water, supply controlling means substantially automatically controlling the supply of said milk solids and water from said feed delivery unit to pre-selected ones of said feed-receiving container means, said feed delivery unit delivering said milk solids and said water in preselected quantities of each with the quantity supplied to some compartments differing from the quantity supplied at other compartments, means for intermittently operating said delivery unit whereby said containers of said horizontally and vertically disposed compartments are intermittently supplied with pre-selcted varying rations of said milk solids and said water, said delivery unit having a feed directing means attached thereto and moving therewith and having multiple terminal outlet means moving past respective compartments of said upper and lower rows, each of said container means having an open-topped feed catching means disposed beneath respective terminal outlet means and intermittently receiving milk solids and water therefrom, said brooder being free of any impediment between said outlet positions and receiving portions of respective upper and lower compartments which must be manually removed to permit pigs to eat from certain ones of said container means after feed has flowed from said feed delivery unit into said certain ones of said container means respectively, each of said container means having an open-topped portion accessible to pigs inside said compartments from which pigs can feed.

2. The combination of claim 1 further comprising said delivery unit having mixing means attached thereto and mixing units of said milk solids and water before their delivery to said terminal outlet means.

3. The combination of claim 1 further comprising said feed delivery unit having a reservoir for containing dry milk solids, output control means forming a part of said supply controlling means and cooperatively correlated with said milk solids reservoir for delivering milk solids therefrom to said feed directing means.

4. The combination of claim 3 in which said output control means comprises a motor and an auger driven by said motor.

5. The combination of claim 1 further comprising said compartments being arranged in two straight rows and said feed delivery unit moving between said rows, and the outermost parts of the brooder as seen in top plan view defining a shape which is much more rectangular than circular for conserving costly floor space.

6. The combination of claim 1 in which said compartment support means has legs for engaging a floor and in which said means for supporting said delivery unit comprises a horizontal track means, said track means being connected to and upheld by said compartment support means, said delivery unit having wheel means engaging and following the top of said track means, and said delivery unit being suspended from said wheel means and being disposed substantially beneath said track means and spaced substantially above the bottoms of said legs.

7. The combination of claim 1 further comprising said supply controlling means comprising a plurality of pre-settable trip means for controlling the quantity of milk solids and water to be delivered to a compartment means, trip means holding means mounted on said support means, said trip means each being mounted on said trip means holding means in operating positions of operable correlation to a respective container means for helping to supply feed to such container means, trigger means mounted on and moving with said feed delivery unit and operatively correlated with said feed delivery unit and with said trip means and engaging respective ones of said trip means when the latter are in operating position, said engagement causing said trigger means to be activated as causes said feed delivery unit to deliver milk solids to said respective container means, said trip means each being movable out of said operating positions for making a pre-setting to cause said trigger means not to be actuated thereby, each of said trip means being positionable so that a plurality of said trip means can control flow of milk solids to a single compartment so that a selected number of trip means can be preset in operating position to selectively control the amount of milk solids to be delivered to that single compartment for feeding pigs of different ages.

8. The combination of claim 7 further comprising said trip means holding means being a bar means with trip means openings therein, said trip means being insertable into and removable from said trip means openings for support of said trip means.

9. The combination of claim 7 further comprising said means for intermittently operating said delivery unit comprising motor means, a source of power, a switch means forming part of said delivery unit, circuit means connecting said source of power and said motor means through said switch means whereby said switch means controls power to said motor means, said trigger means controlling said switch means.

10. The combination of claim 1 in which the interior of the container means of one of said compartments is out of communication with the interior of the container means of adjacent compartments.

11. The combination of claim 1 in which said containers each have open-topped portions inside said compartments accessible to pigs therein.

12. The combination of claim 1 in which said feed-receiving means presents said feed at a place sufficiently close to the floor of said compartments that pigs in said compartments less than 1 week old can reach said feed-receiving means and eat the feed therefrom.

13. A pig brooder for simultaneously and substantially automatically feeding to baby pigs 1, 2 and 3 weeks old varying rations of liquid comprising support means, a plurality of vertically and horizontally spaced compartments disposed in upper and lower rows, said compartments being mounted on said support means, a feed delivery unit, means for supporting said delivery unit relative to said compartments, feed-receiving container means mounted on each said compartment and adapted to receive delivery from said delivery unit, means repeatedly moving said delivery unit automatically past one side of said compartments, said compartments having feed passage openings therethrough and said compartments having no openings therethrough during proper use larger than the head of a baby pig less than 1 week old whereby baby pigs cannot fall out, said feed delivery unit delivering to pre-selected ones of said container means a pre-selected quantity of liquid consumable by baby pigs less than 3 weeks old, supply controlling means substantially automatically controlling the supply of said liquid from said feed delivery unit to pre-selected ones of said feed-receiving container means, said feed delivery unit delivering said liquid in pre-selected quantities with the quantity supplied to some compartments differing from the quantity supplied at other compartments, means for intermittently operating said delivery unit whereby said containers of said horizontally and vertically disposed compartments are intermittently supplied with said pre-selected varying rations of liquid, said delivery unit having a feed directing means attached thereto and moving therewith and having multiple terminal outlets means moving past respective compartments of said upper and lower rows, each of said container means having an open-topped feed catching means disposed beneath respective terminal outlet means and intermittently receiving said liquid therefrom, said brooder being free of any impediment between said terminal outlet positions and receiving portions of respective upper and lower compartments which must be manually removed to permit pigs to eat from certain ones of said container means after feed has flowed from said feed delivery unit into said certain ones of said container means respectively, each of said container means having an open-topped portion accessible to pigs inside said compartments from which pigs can feed.

14. The combination of claim 13 further comprising said supply controlling means comprising a plurality of presettable trip means for controlling the quantity of liquid to be delivered to a compartment means, trip means holding means mounted on said support means, said trip means each being mounted on said trip means holding means in operating positions of operable correlation to a respective container means for helping to supply feed to such container means, trigger means mounted on and moving with said feed delivery unit and operatively correlated with said feed delivery unit and with said trip means and engaging respective ones of said trip means when the latter are in operating position, said engagement causing said trigger means to be activated as causes said feed delivery unit to deliver liquid to said respective container means, said trip means each being movable out of said operating positions for making a pre-setting to cause said trigger means not to be actuated thereby, each of said trip means being positionable so that a plurality of said trip means can control flow of liquid to a single compartment so that a selected number of trip means can be preset in operating position to selectively control the amount of liquid to be delivered to that single compartment for feeding pigs of different ages.

15. The combination of claim 14 further comprising said trip means holding means being a bar means with trip means openings therein, said trip means being insertable into and removable from said trip means openings for support of said trip means.

16. The combination of claim 14 further comprising said means for intermittently operating said delivery unit being operated by motor means, a source of power, a switch means forming part of said delivery unit, circuit means connecting said source of power and said motor means through said switch means whereby said switch means controls power to said motor means, said trigger means controlling said switch means.

17. The combination of claim 13 in which said compartment support means has legs for engaging a floor and in which said means for supporting said delivery unit comprises a horizontal track means, said track means being connected to and upheld by said compartment support means, said delivery unit having wheel means engaging and following the top of said track means, and said delivery unit being suspended from said wheel means and being disposed substantially beneath said track means and spaced substantially above the bottoms of said legs.

18. An animal feeder comprising support means, a plurality of vertically and horizontally spaced compartments disposed in upper and lower rows, said compartments being connected to said support means, a feed delivery unit, means for supporting said delivery unit relative to said compartments, feed-receiving means connected to each said compartment, and adapted to receive feed from said delivery unit, means for continuously moving said delivery unit past said compartments, means for controlling the supply of feed from said delivery unit to said feed receiving means, and means for intermittently operating said delivery unit whereby said horizontally and vertically disposed compartments are sequentially supplied with feed, said delivery unit having a feed outlet moving therewith and attached thereto, said feed outlet moving along said upper and lower rows of compartments and in which said receiving means comprises containers disposed one at each compartment, each said container having at least a portion disposed outside of its compartment, said outside portion having an open top section disposed beneath and intermittently receiving feed from said outlet, the containers in said upper row of compartments being disposed substantially in a row generally parallel to their said compartment row, and the containers in said lower row of compartments also being disposed substantially in a row generally parallel to said top row containers, a receptacle attached to said feed delivery unit and moving therewith along said one side of said rows of compartments, said receptacle being spaced beneath said outlet whereby at certain times when the said outside portion of one of the containers in said upper row of compartments is not disposed beneath and in the path of feed from said outlet, then at such certain times feed flowing from said outlet will fall by gravity downward into said receptacle, and a conduit in communication with the bottom of said receptacle and extending downwardly into a position disposed directly above the outside portion of one of the containers of said lower row at such certain times of feed delivery.

19. The combination of claim 18 in which a pre-settable means is operatively correlated with said delivery unit for causing a flow of feed from said outlet, said pre-settable means being settable for delivery of feed to a container in said lower row at said certain times.

20. An animal feeder comprising support means, a plurality of spaced compartments connected to said support means, a feed delivery unit, means for supporting said delivery unit relative to said compartments, feed-receiving means connected to each said compartment and adapted to receive feed from said delivery unit, means for continuously moving said delivery unit past said compartments, means for controlling the supply of feed from said delivery unit to said feed-receiving means, and means for intermittently operating said delivery unit whereby said compartments are sequentially supplied with feed, said delivery unit mounting and propulsion means comprising a horizontally extending track means, said track means having a generally horizontally extending upper side and having two opposite downwardly extending sides, said upper side having two opposite edges, a pulley having an annular circumferential recess therein, the side walls of said recess having a tapering shape in a cross section taken along a plane extending through the axis of said pulley wheel and being more widely spaced at their outer ends than at their inner ends, and the spacing of said side walls at the outer portions of said pulley side walls being greater than the spacing of the sides of said track means and the spacing of said pulley side walls at their inner portions being substantially lesser than the spacing of upper edges of the sides of said track means whereby as said pulley rolls along said track means it will grip said track means firmly and impinge thereon giving good traction, said delivery unit having a delivery unit supporting means extending downwardly from and rotatably attached to said pulley whereby the weight of said delivery unit tends to press said pulley against said track means.

21. The combination of claim 20 in which said delivery unit supporting means has a pair of horizontally spaced stabilizing pulleys attached rotatably thereto for rotation about vertical axes, said stabilizing pulleys being spaced downwardly from said drive pulley and engaging opposite side walls of said track means respectively.

22. A liquid animal feeder as defined in claim 18 including heating means operably connected to said delivery unit whereby the temperature of the feed at said delivery unit is maintained at a substantially constant temperature.

23. An animal feeder comprising support means, a plurality of spaced compartments mounted on said support means, each said compartment having openings formed therein of a size less than the size of the heads of animals adapted to be disposed in each said compartment, a feed delivery unit, means for supporting said feed delivery unit relative to said compartments, feed-receiving means connected to said compartments and constructed and arranged to direct feed received from said delivery unit into said compartments, means for moving the feed delivery unit past said compartments, means for controlling the supply of feed from said feed delivery unit to said feed-receiving means, and means for intermittently operating said feed delivery unit whereby said compartments are sequentially supplied with feed, said feed delivery unit includes a compartment for receiving a dry feed material, a chamber, an auger for directing the dry feed material from said delivery unit compartment into said chamber, means for introducing a liquid into said chamber, and means for mixing the liquid and dry material to provide a liquid food which is subsequently supplied to said feed-receiving means.

24. An animal feeder as defined in claim 23 including a second chamber adapted to receive a dry feed material, and means for directing the dry feed material into a conduit which is constructed and arranged to direct the material into said feed receiving means.

25. The combination of claim 13 in which said delivery unit has a source of said liquid thereon, all of the said multiple terminal outlet means which deliver said liquid receiving said liquid indirectly from said source.

26. The combination of claim 1 in which said delivery unit has a source of said milk solids thereon, all of the said multiple terminal outlet means which deliver said milk solids receiving said milk solids indirectly from said source.

27. The combination of claim 13 in which said feed delivery unit moves past said compartments continuously.

* * * * *